(12) United States Patent
MeLampy et al.

(10) Patent No.: US 7,536,546 B2
(45) Date of Patent: May 19, 2009

(54) SYSTEM AND METHOD FOR PROVIDING ENCRYPTION FOR REROUTING OF REAL TIME MULTI-MEDIA FLOWS

(75) Inventors: Patrick J. MeLampy, Pepperell, MA (US); Ephraim W. Dobbins, Windham, NH (US); Stephen E. Norton, Merrimac, MA (US); Robert F. Penfield, Concord, MA (US)

(73) Assignee: Acme Packet, Inc., Burlington, MA (US)

( * ) Notice: Subject to any disclaimer, the term of this patent is extended or adjusted under 35 U.S.C. 154(b) by 913 days.

(21) Appl. No.: 09/941,229

(22) Filed: Aug. 28, 2001

(65) Prior Publication Data

US 2003/0051130 A1    Mar. 13, 2003

(51) Int. Cl.
*H04L 9/00*      (2006.01)
*H04L 29/06*     (2006.01)
(52) U.S. Cl. ...................... 713/162; 370/412
(58) Field of Classification Search ................ 713/153; 380/46–49, 261; 714/746, 774, 807; 370/352
See application file for complete search history.

(56) References Cited

U.S. PATENT DOCUMENTS

| 5,111,453 | A |   | 5/1992 | Morrow ............... 370/85.13 |
| 5,450,394 | A |   | 9/1995 | Gruber et al. |
| 5,457,679 | A | * | 10/1995 | Eng et al. ............. 370/395.31 |
| 5,513,345 | A |   | 4/1996 | Sato et al. |
| 5,541,995 | A | * | 7/1996 | Normile et al. ............. 380/42 |
| 5,623,548 | A | * | 4/1997 | Akiyama et al. ............. 380/28 |
| 5,862,160 | A | * | 1/1999 | Irvin et al. ................. 714/807 |

(Continued)

FOREIGN PATENT DOCUMENTS

EP         0 779 727 A2    6/1997

(Continued)

OTHER PUBLICATIONS

Schulzrinne et al., "RTP: A Transport Protocol for Real-Time Applications," Network Working Group, Jan. 1996, pp. 1-66.

(Continued)

*Primary Examiner*—Gilberto Barron, Jr.
*Assistant Examiner*—Arezoo Sherkat
(74) *Attorney, Agent, or Firm*—Thomas, Kayden, Horstemeyer & Risley, LLP (57) ABSTRACT

A system for providing encryption for the rerouting of multimedia data flow packets is disclosed. Generally, a first endpoint is connected to a second endpoint, wherein the first endpoint comprises a transceiver, encryption software stored within the first endpoint defining functions to be performed by the first endpoint, and a processor. The processor is configured by the encryption software to perform the steps of: assigning a sequence number to a first multi-media data flow packet received by a first endpoint, wherein the first multi-media data flow packet is within a series of multi-media data flow packets; pseudo-randomly shuffling the sequence number of the first multi-media data flow packet; and, transmitting the pseudo-randomly shuffled sequence number to a second endpoint. These steps may be performed by a programmed controller, or other hardware, instead of, or in addition to, being performed in accordance with software.

20 Claims, 4 Drawing Sheets

U.S. PATENT DOCUMENTS

| | | | |
|---|---|---|---|
| 5,878,032 A | 3/1999 | Mirek et al. | |
| 5,898,697 A | 4/1999 | Hurme et al. | |
| 5,966,450 A * | 10/1999 | Hosford et al. | 380/261 |
| 6,023,455 A | 2/2000 | Takahashi | |
| 6,032,266 A | 2/2000 | Ichinohe et al. | |
| 6,141,788 A * | 10/2000 | Rosenberg et al. | 714/774 |
| 6,404,733 B1 | 6/2002 | Shah et al. | |
| 6,501,763 B1 | 12/2002 | Bhagavath et al. | |
| 6,535,481 B1 | 3/2003 | Andersson et al. | |
| 6,567,929 B1 | 5/2003 | Bhagavath et al. | |
| 6,574,230 B1 * | 6/2003 | Almulhem et al. | 370/412 |
| 6,643,496 B1 | 11/2003 | Shimoyama et al. | |
| 6,678,250 B1 | 1/2004 | Grabelsky et al. | |
| 6,687,247 B1 | 2/2004 | Wilford et al. | |
| 6,741,569 B1 | 5/2004 | Clark | |
| 6,771,597 B2 * | 8/2004 | Makansi et al. | 370/230 |
| 6,775,280 B1 | 8/2004 | Ma et al. | |
| 6,782,490 B2 * | 8/2004 | Maxemchuk et al. | 714/18 |
| 6,785,273 B1 | 8/2004 | Verma | |
| 6,826,684 B1 * | 11/2004 | Fink et al. | 713/160 |
| 6,973,184 B1 * | 12/2005 | Shaffer et al. | 379/420.01 |
| 7,124,101 B1 * | 10/2006 | Mikurak | 705/35 |
| 7,130,807 B1 * | 10/2006 | Mikurak | 705/7 |
| 7,353,380 B2 * | 4/2008 | VanHeyningen | 713/150 |
| 7,360,075 B2 * | 4/2008 | VanHeyningen et al. | 713/151 |
| 2001/0048660 A1 | 12/2001 | Saleh et al. | |
| 2001/0052072 A1 * | 12/2001 | Jung | 713/160 |
| 2002/0001302 A1 * | 1/2002 | Pickett | 370/352 |
| 2002/0004843 A1 | 1/2002 | Andersson et al. | |
| 2002/0009073 A1 | 1/2002 | Furukawa et al. | |
| 2002/0112152 A1 * | 8/2002 | VanHeyningen et al. | 713/151 |
| 2002/0172157 A1 | 11/2002 | Rhodes | |
| 2003/0033418 A1 | 2/2003 | Young et al. | |
| 2004/0114595 A1 | 6/2004 | Doukai | |
| 2005/0060295 A1 * | 3/2005 | Gould et al. | 707/3 |
| 2005/0265228 A1 | 12/2005 | Fredette et al. | |
| 2008/0141020 A1 * | 6/2008 | VanHeyningen | 713/150 |

FOREIGN PATENT DOCUMENTS

| | | |
|---|---|---|
| EP | WO 98/20647 | 5/1998 |
| EP | 0 948 165 | 1/1999 |
| GB | 2 355 901 | 2/2001 |

OTHER PUBLICATIONS

Swale et al., "Requirements for the MIDCOM Architecture and Control Language," MIDCOM Working Group, Internet Draft, Feb. 2001, p. 1-24.
Srisuresh et al., "Middlebox Communication Architecture and Framework," Network Working Group, Internet Draft, Feb. 2001, pp. 1-37.
Martin et al., "SIP Through NAT Enabled Firewall Call Flows," Midcom Working Group, Internet Draft, Feb. 2001, pp. 1-63.
Rosenberg et al., "Getting SIP through Firewalls and NATs," Internet Engineering Task Force, Internet Draft, Feb. 22, 2000, pp. 1-57.
Eliot Lear, "A Middle Box Architectural Framework," Network Working Group, Internet Draft, Jan. 31, 2001, pp. 1-12.
Rosenberg et al., "SIP Traversal through Residential and Enterprise NATs and Firewalls," Internet Engineering Task Force, Internet Draft, Mar. 2001, pp. 1-41.
Carpenter et al., "Middleboxes: Taxonomy and Issues," The Internet Society, Internet Engineering Task Force, Internet Draft, Apr. 2001, pp. 1-24.
B. Biggs, "A SIP Application Level Gateway for Network Address Translation," Internet Draft, Mar. 2000, pp. 1-16.
Kuthan et al., "Middlebox Communication: Framework and Requirements," Internet Engineering Task Force, Internet Draft, Nov. 2000, pp. 1-23.
P. Srisuresh, "Framework for Interfacing with Network Address Translator," NAT Working Group, Internet Draft, Apr. 2000, pp. 1-58.
Mart et al., "Firewall Control Requirements," MidCom Bof, Internet Draft, Nov. 2000, pp. 1-16.
Melinda Shore, "H.323 and Firewalls: Problem Statement and Solution Framework," Internet Draft, Feb. 3, 2000, pp. 1-19.
Thernelius et al., "SIP Firewall Solution," SIP Working Group, Internet Draft, Jul. 2000, pp. 1-32.
N. Freed, "Behavior of and Requirements for Internet Firewalls," Network Working Group, Internet Draft, Oct. 2000, 1-14.
D. Newman, "Benchmarking Terminology for Firewall Performance," Network Working Group, The Internet Society, Aug. 1999, pp. 1-51.
F. Finlayson, "IP Multicast and Firewalls," Network Working Group, The Internet Society, May 1999, pp. 1-23.
S. Bellovin, "Firewall-Friendly FTP," Network Working Group, Feb. 1994, pp. 1-7.
Montenegro et al., "Sun's SKIP Firewall Traversal for Mobile IP," Network Working Group, The Internet Society, Jun. 1998, pp. 1-45.
Gaynor et al., "Firewall Enhancement Protocol (FEP)," Network Working Group, The Internet Society, Apr. 1, 2001, pp. 1-22.
Dr. Andrew Molitor, "A Firewall Solution for Voice Over IP," Aravox Report, Aravox Technologies, pp. 1-2.
"Aravox Firewall Benefits," Aravox Technologies, pp. 1-9.
Dr. Andrew Molitor, "Can Voice Over IP Work Without Dynamic NAT?," Aravox Report, Aravox Technologies, pp. 1-2.
Dr. Andrew Molitor, "Deploying a Dynamic Voice over IP Firewall with IP Telephony Applications," Aravox Report, Aravox Technologies, pp. 1-5.
Dr. Andrew Molitor, "Firewall Control for IP Telephony," Aravox Report, Aravox Technologies, pp. 1-5.
Molitor et al., "High Performance H.323 Firewalling for VoIP Solutions," Aravox Report, Aravox Technologies, pp. 1-2.
"What is Unique about IP Telephony?," Aravox Technologies, Spring 2001 IT Expo, pp. 1-16.
Dr. Andrew Molitor, "Securing VoIP Networks with Specific Techniques, Comprehensive Policies and VoIP-Capable Firewalls," Aravox Report, Aravox Technologies, pp. 1-3.
Utz Roedig, "Security Analysis of IP-Telephony Scenarios," Presentation by Darmstadt University of Technology, pp. 1-28.
Fredrik Thernelius, "SIP, NAT, and Firewalls," Master Thesis, Ericsson, May 2000, pp. 1-69.
Steven M. Bellovin, "Distributed Firewalls";login: Magazine, Nov. 1999, pp. 37-39 (1-10).
"Firewall ActiveX Control for Microsoft Windows," Distinct Corporation, 1998, pp. 1-45.
Jiri Kuthan, "Firewall Control," Flow Processing Control Protocol, p. 1-3.
Alan Crosswell, "Advanced Networking Information," Columbia University Academic Information Systems, Mar. 21, 2000, pp. 1-22.
"Cisco Secure PIX Firewall Software v5.2," Cisco Data Sheet, pp. 1-7.
"Cisco Secure PIX 500 Firewalls," Cisco Products & Technologies, 2000, pp. 1-3.
"Cisco Secure PIX Firewall," Internet Product Watch, Apr. 12, 2001, pp. 1-2.
"Media Firewall," www.marconi.com, 2000, pp. 1-4.
"Media Firewall," www.marconi.com, 2001, pp. 1-3.
"ATM Switch Network Modules: LAN, WAN, and Service Interfaces for TNX-210, TNX-1100, ASX-200BX, ASX-1000 and ASX-1200 ATM Switches," www.marconi.com, 2000, pp. 1-12.
"Marconi's Next Generation IP and Multi-Service Switch Router Enables End-to-End Differentiated Services," www.marconi.com, Nov. 6, 2000, pp. 1-3.
"Transforming Communications and Information with Enterprise-Focused Ethernet Solutions," www.marconi.com., pp. 1-6.
"Marconi Expands Networking Product Portfolio with Solutions for Emerging Enterprise Needs," www.marconi.com, Jul. 24, 2000, pp. 1-2.
"Marconi to Showcase 'Smart and Fast' Switch/Router at CeBIT," www.marconi.com, Jan. 22, 2001, pp. 1-2.
"Marconi Demonstrates Converged Distance-Learning Solutions at Educause 2000," www.marconi.com, Oct. 10, 2000, pp. 1-2.
"Firewall Security," www.marconi.com, Oct. 30, 2000, pp. 1-2.

"SA-400, IP/ATM Firewalling for ATM Networks," www.marconi.com, 2000, pp. 1-4.

"NSX-9500, Routing, LANE, and Firewalling Services for ATM Backbone Networks," www.marconi.com, 2000, pp. 1-4.

"The New Public Network: Scalable, Flexible, PSTN Features, IN Features, Signalling Gateway," www.marconi.com, 1999, pp. 1-4.

"Sphericall Voice Internetworking Multiplexer (VIM) Product Overview," www.marconi.com, 2001, p. 1.

"ServiceOn Accountant 2.0: Per-call Usage Based Billing for Differentiated Services," www.marconi.com, Dec. 12, 2000, pp. 1-2.

"Marconi Extends Optical Networking; Introduces Advanced Multiservice Platform," www.marconi.com, Jun. 6, 2000, pp. 1-2.

"ATM Switched Network Modules Product Overview," www.marconi.com, 2001, pp. 1-4.

"Security is the Key," Marconi Interface, May 2000, p. 30.

"Firewall Switching Agent," www.marconi.com, 2001, pp. 1-4.

"ESX-2400 and ESX-4800 Firewall Accelaration Switches," www.marconi.com, 2001, pp. 1-8.

"ESX-2400 and ESX-4800 Product Overview," www.marconi.com, 2001, pp. 1-3.

"FSA Product Overview," www.marconi.com, 2001, pp. 1-2.

Parthenios, "Hackers Beware," Telephony, Jun. 18, 2001, pp. 1-2.

"Aravox Expands IP Platform to Include VoIP," CommWeb.com, May 30, 2001, p. 1.

"Aravox Expands IP Network Services Platform to Carriers and xSP's Deploying VoIP," biz.yahoo.com., May 29, pp. 1-2.

"Aravox Expands IP Network Services Platform to Carriers and Service Providers Deploying VoIP,". TMCnet.com, May 29, 2001, pp. 1-2.

"Solutions,": www.aravox.com/solutions, 2001, p. 1.

"The Aravox Network Services Platform Solution for Backbone Carriers," www.aravox.com/backbone, 2001, p. 1.

"The Aravox Network Services Platform Solution for Access Providers," www.aravox.com/access, 2001, p. 1.

"The Aravox Network Services Platform Solution for Enterprises," www.aravox.com/enterprise, 2001, p. 1.

"SIP ALG for Firewall Traversal (Application Level Gateway)," www.microappliances.com, 2000, p. 1.

"SIP Firewall/Outbound Proxy Server (ALG)," www.microappliances.com, 2000, p.1.

"Microappliances SIP Phone (ActiveX)," www.microappliances.com, 2000, p.1.

"Convergence Data and Telephony Platform," www.microappliances.com, 2000, p.1.

English Translation for the Office Action in JP 2002-249228 mailed Aug. 12, 2008.

Nakamura, et al., "Use of Packet encryption for communication under firewalls", Technical report of IEICE, vol. 97, No. 618, Mar. 20, 1998, p. 85-89.

Doi, "Trends of cryptographic technologies and security", Journal of Information Processing Society of Japan, Aug. 15, 1989, p. 892-901.

Busses I et al., "Dynamic QoS Control of Multimedia Applications based on RTP" Computer Communications, Elsevier Science Publishers BV, 1996, pp. 49-58.

European Search Report, 2004.

Article entitled "The Layered Approach: The OSI Model", XP-000917810, 1991, pp. 446-456.

Articel entitled "Dynamic Qos Control of Multimedia Applications Based on RTP", by Busse, et al., dated 1996 Elsevier Science B.B., pp. 49-58.

Article entitled "6.1 Introduction". XP-002096069, 1991, pp. 205-213.

* cited by examiner

SYSTEM AND METHOD FOR PROVIDING ENCRYPTION FOR REROUTING OF REAL TIME MULTI-MEDIA FLOWS

CROSS-REFERENCE TO RELATED APPLICATIONS

This application claims the benefit of U.S. patent application entitled "System and Method for Determining Flow Quality Statistics for Real-Time Transport Protocol Data Flows," filed on Jul. 23, 2001, and having Ser. No. 09/911,256, and U.S. Application entitled "System and Method for Providing Rapid Rerouting of Real-Time Multi-media Flows," filed on Jul. 23, 2001, and having Ser. No. 09/911,304, the disclosures of which are incorporated by reference herein in their entirety.

FIELD OF THE INVENTION

The present invention relates generally to the transmission of multi-media data packets, and more particularly to the encryption of multi-media data packets.

BACKGROUND OF THE INVENTION

The public switched telephone network (PSTN) has evolved into an efficient real-time, multi-media communication session tool wherein users can pick up any one of nearly one billion telephones and dial any one of nearly one billion endpoints. Several developments have enabled this automated network, such as numbering plans, distributed electronic switching and routing, and networked signaling systems.

Similar to the manner in which the PSTN is based on a hierarchy, the Internet is based on an Internet protocol (IP). IP messages are routed or forwarded from one link to the next (i.e., from a source of a data flow to a destination of the data flow). Each IP packet contains an IP address, which, in Internet protocol version 4 (IPv4), has 32 bits. Each IP address also has a certain number of bits dedicated to a network portion and a certain number of bits dedicated to a host portion.

IP routers are used to take a data packet from one network (or link) and place it onto another network (or link). Tables are located within IP routers that contain information or criteria used to determine a best way to route the data packet. An example of this information may be the state of network links and programmed distance indications. By using intelligent devices on both sides of a network domain, it is possible to allocate a temporary address to route a packet through a network and restore the original address on the far side of the network when the packet leaves the network. This is the basis for many current virtual private network (VPN) products and is understood in the art.

To ensure that the network elements (e.g., switches in the telephone network, routers in the data network) can perform their associated tasks, it helps for them to know the status of adjacent communication links and available routes; signaling systems are used to provide this information. In telephone networks, signaling systems used are either SS7 or are equivalent to SS7. The signaling system provides information about individual links, link sets, routes, etc. In data networks, protocols such as border gateway protocol (BGP), interior gateway protocol (IGP), open shortest path first (OSPF), etc., are used to determine link states and routes.

Due to most current telecommunication endpoints receiving service through a PSTN-based system, a gateway is used to facilitate a multi-media data flow between a packet data network and a PSTN. Gateways are installed at edges between data networks and voice networks, wherein the gateways are used to convert multi-media (and signaling) to ensure communication. There are several strategies for routing calls received by gateways to other gateways described in the art. Two of these strategies are full mesh routing and hierarchical routing. Full mesh routing is the standard method described in most of the softswitching architectures. Session initiation protocol (SIP) is the inter-softswitch signaling system because it supports an anywhere-to-anywhere signaling model. In this model, softswitches have a virtual connection to other softswitches for completing calls. Routing tables are instantiated that can be used to direct traffic to a softswitch based on policy provided by the softswitch maker.

Unfortunately, when running a network that comprises many softswitches, the owner of the network has many different points of policy management that need to be maintained to create a full mesh. Such policy management issues include assuring that each softswitch knows the IP address of each other softswitch and what telephone numbers or PSTN to which they connect. When running softswitches from multiple vendors, further management issues arise. The management issues are then more complicated due to the fact that the equipment may be managed through different interfaces.

When the number of softswitches deployed grows large, the sharing of different routes is likely. In the full mesh routing arrangement, the routing of calls may be difficult since several different egress softswitches may be full or not functioning. For example, if a carrier has thirty softswitches that can handle national long distance, and the network is running at about 50% full, then each originating softswitch will likely have to try an average of fifteen (15) separate softswitches before finding one with a non-blocked route. This search effort can be greatly reduced if a purely random distribution is implemented, however, it is assumed that some routes would be preferred over others due to cost or quality, thereby exacerbating the problem.

Therefore, guiding real-time packet flows, such as, but not limited to, multi-media flows, through certain thresholds, which is required to create a high-quality border between various IP networks, is important. Without proper guidance, the packets would flow whichever way the networks would allow, thereby subjecting multi-media data packets to disruptive paths, as well as upstream and downstream failures.

If a guided multi-media data flow is traversing over public networks, it is desirable to prevent any person from eavesdropping on the communication. To address this issue, signaling channels can be encrypted using transport layer security (TLS), however, there is no known mechanism for encrypting multi-media data packets. Endpoints are assumed to comprise functionality to perform encryption. This is problematic in a network where sessions are routed to destinations such as telephone numbers. The problem is that the actual termination point is unknown until it is discovered. As an example, there may be multiple different termination points possible for a particular communication session. The actual termination point chosen may be selected for different reasons. Therefore, when forward routing a communication session, the actual terminating equipment is not known in advance.

Specific reasons for problems associated with encryption are based on currently used mechanisms. As an example, a certificate of authentication, and a certificate of authority are generally used in the most advanced forms of encryption. The volume and delays associated with using certificate servers are significant. It may also be the case that using manually distributed private keys could work, however, this is the case if the number of destinations are limited to a known set in advance which would facilitate the distribution.

SUMMARY OF THE INVENTION

In light of the foregoing, the preferred embodiment of the present invention generally relates to a system and method for providing encryption for rerouting multi-media data flow packets.

Generally, with reference to the structure of the encryption system, the system utilizes a first endpoint, which is connected to a second endpoint, wherein the first endpoint comprises a transceiver, encryption software stored within the first endpoint defining functions to be performed by the first endpoint, and a processor. The processor is configured by the software to perform the steps of: assigning a sequence number to a first multi-media data flow packet received by a first endpoint, wherein the first multi-media data flow packet is within a series of multi-media data flow packets; pseudo-randomly shuffling the sequence number of the first multi-media data flow packet; and, transmitting the pseudo-randomly shuffled sequence number to a second endpoint.

The encryption system may instead be provided completely in hardware wherein functionality defined by the software is instead provided by a controller that is programmed to perform the steps of: assigning a sequence number to a first multi-media data flow packet received by a first endpoint, wherein the first multi-media data flow packet is within a series of multi-media data flow packets; pseudo-randomly shuffling the sequence number of the first data flow packet; and transmitting the pseudo-randomly shuffled sequence number to a second endpoint.

The present invention can also be viewed as providing a method for providing encryption for rerouting multi-media data flow packets. In this regard, the method can be broadly summarized by the following steps: assigning a sequence number to a first multi-media data flow packet received by a first endpoint, wherein the first multi-media data flow packet is within a series of multi-media data flow packets; pseudo-randomly shuffling the sequence number of the first multi-media data flow packet; and transmitting the pseudo-randomly shuffled sequence number to a second endpoint.

Other features and advantages of the present invention will be or will become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components of the drawings are not necessarily to scale, emphasis instead being placed upon clearly illustrating the principles of the present invention. Moreover, in the drawings, like referenced numerals designate corresponding parts throughout the several views.

DETAILED DESCRIPTION OF THE PREFERRED EMBODIMENT

The present invention provides an encryption system for encrypting multi-media data flow packets. The encryption system of the present invention can be implemented in software, firmware, hardware, or a combination thereof. In the preferred embodiment of the invention, which is intended to be a non-limiting example, a portion of the encryption system is implemented in software that is executed by a computer, for example, but not limited to, a personal computer, workstation, minicomputer, or mainframe computer.

The software portion of the encryption system, which comprises an ordered listing of executable instructions for implementing logical functions, can be embodied in any computer-readable medium for use by, or in connection with, an instruction execution system, apparatus, or device such as a computer-based system processor-containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus or device. The computer-readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disk read-only memory (CD ROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

In the transmission of multi-media data packets from a first endpoint to a second endpoint the processing of multiple transmission routes, and the selection of a best route, is desirable. An example of a system that provides for route processing and selection is provided by the co-pending U.S. patent application entitled, "System and Method for Assisting in Controlling Real-time Transport Protocol Flow Through Multiple Networks via Multi-media Flow Routing," by MeLampy, et. al, filed on Jul. 23, 2001, and having Ser. No. 09/911,256 (hereinafter, "the '256 patent application"), the disclosure of which is hereby incorporated by reference in its entirety.

The '256 patent application teaches use of a session router to select multiple routes and process them in order, selecting from a set of session initiation protocol (SIP) agent(s) that are otherwise equal using various distribution strategies. This process leads to managing the path of the resulting real-time packet (RTP) flow. The US patent application entitled "System and Method for Providing Rapid Rerouting of Real Time Multi-media Flows," by *MeLampy*, et. al., filed on Jul. 23, 2001, having Ser. No. 09/911,304 (hereinafter "the '304 patent application"), the disclosure of which in hereby incorporated by reference in its entirety, teaches use of multi-media routers for guiding the resulting RTP flows selected and processed by the session router through certain thresholds. Therefore, the combination of the above-mentioned '256 and '304 patent applications creates a high-quality border between various IP networks. Without these mechanisms, data packets would flow whichever way networks would allow.

Figure 1:
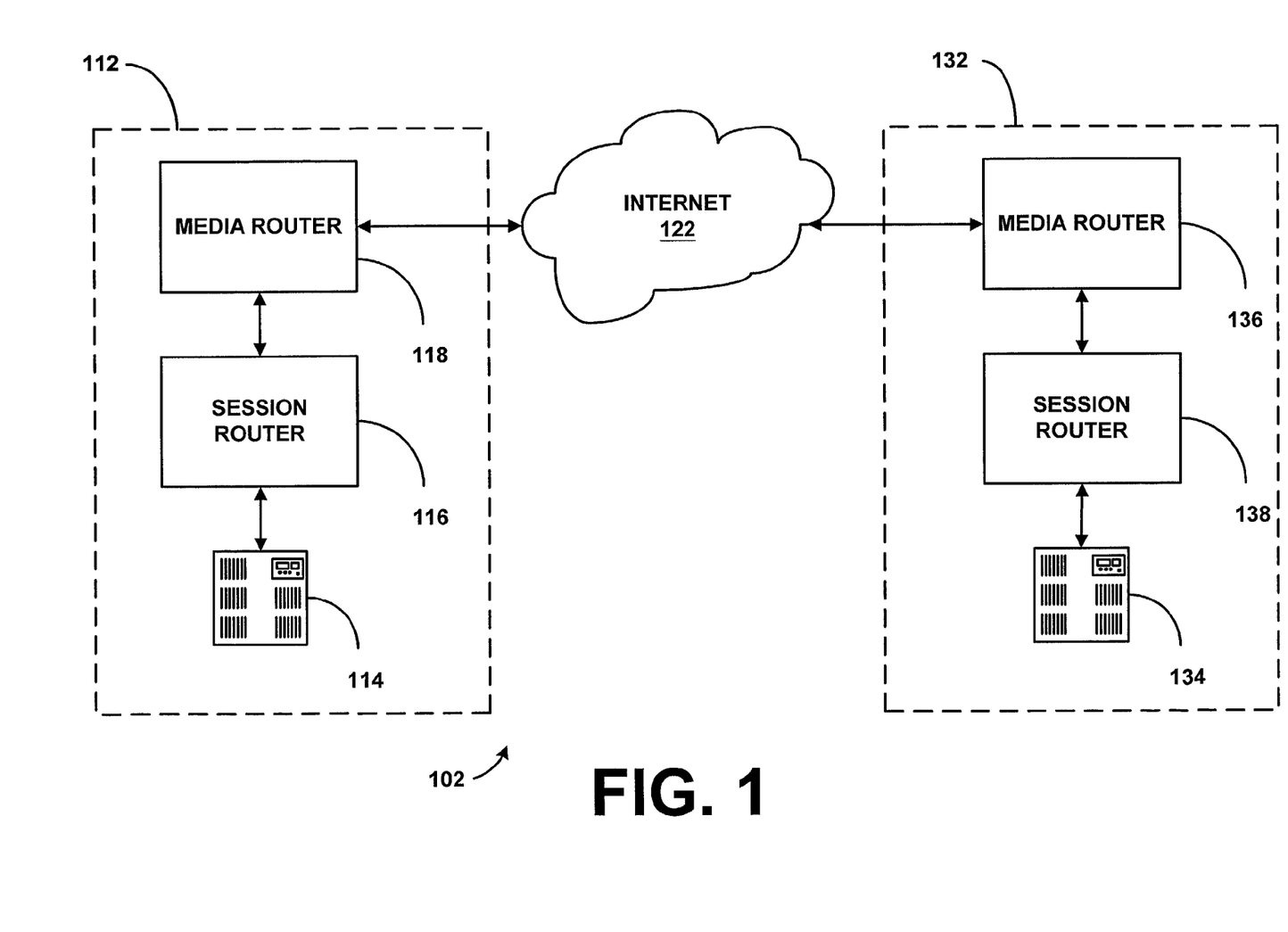
FIG. 1 is a block diagram that illustrates a communication network, wherein the use of session routers and multi-media routers is demonstrated, for implementation of the present encryption system.

FIG. 1 is a block diagram that illustrates a communication network 102, wherein the use of session routers (SRs) and multi-media routers (MRs) is demonstrated, for implementation of the present encryption system. As shown by FIG. 1, a first carrier network 112 comprises a first SIP phone 114, such as those produced by Pingtel of Massachusetts, U.S.A., a first session router 116, and a first multi-media router 118. A second carrier network 132, which is connected to the first carrier network 112 via an Internet 122, comprises a second SIP phone 134, a second session router 138, and a second multi-media router 136. It should be noted that any device, SIP or non-SIP, may be included within the first and second carrier networks 112, 132 that requires communication between the networks 112, 132. Other RTP data sources include, but are not limited to, integrated access devices (IAD), VoIP gateways (Cisco AS5300, Sonus GSX), and multi-media sources (PCs, IP-PBXs). Further, communication between the networks 112, 132 may instead be provided via a wide area network (WAN) or local area network (LAN). Also, the Internet 122, may instead be a data network domain since the multi-media routers 118, 136 are utilized between two domains within the Internet 122.

Alternatively, a router, such as, but not limited to, a border router, may be located between the first and second multi-media routers 118, 136 to assist in communication between the first and second carrier networks 112, 132. Communication from the first SIP phone 114 to the second SIP phone 134 may instead be provided by the first and second multi-media routers 118, 136, as is further explained in detail hereinbelow. It should be noted, however, that an additional router, such as a border router, is not necessary in providing communication between the first and second carrier networks 112, 132. It should also be noted that communication may be from a session router, directly to the Internet 122, and not through the multi-media routers 118, 136.

The first and second session routers 116, 138 provide session initiation protocol (SIP) and telephony routing over IP (TRIP) protocol support as described in detail by the presently pending application titled "System and Method for Assisting in Controlling Real-Time Transport Protocol Flow Through Multiple Networks," by *MeLampy* et. al., having Ser. No. 09/844,204, and being filed on Apr. 27, 2001, the disclosure of which is incorporated herein by its entirety.

Figure 2:
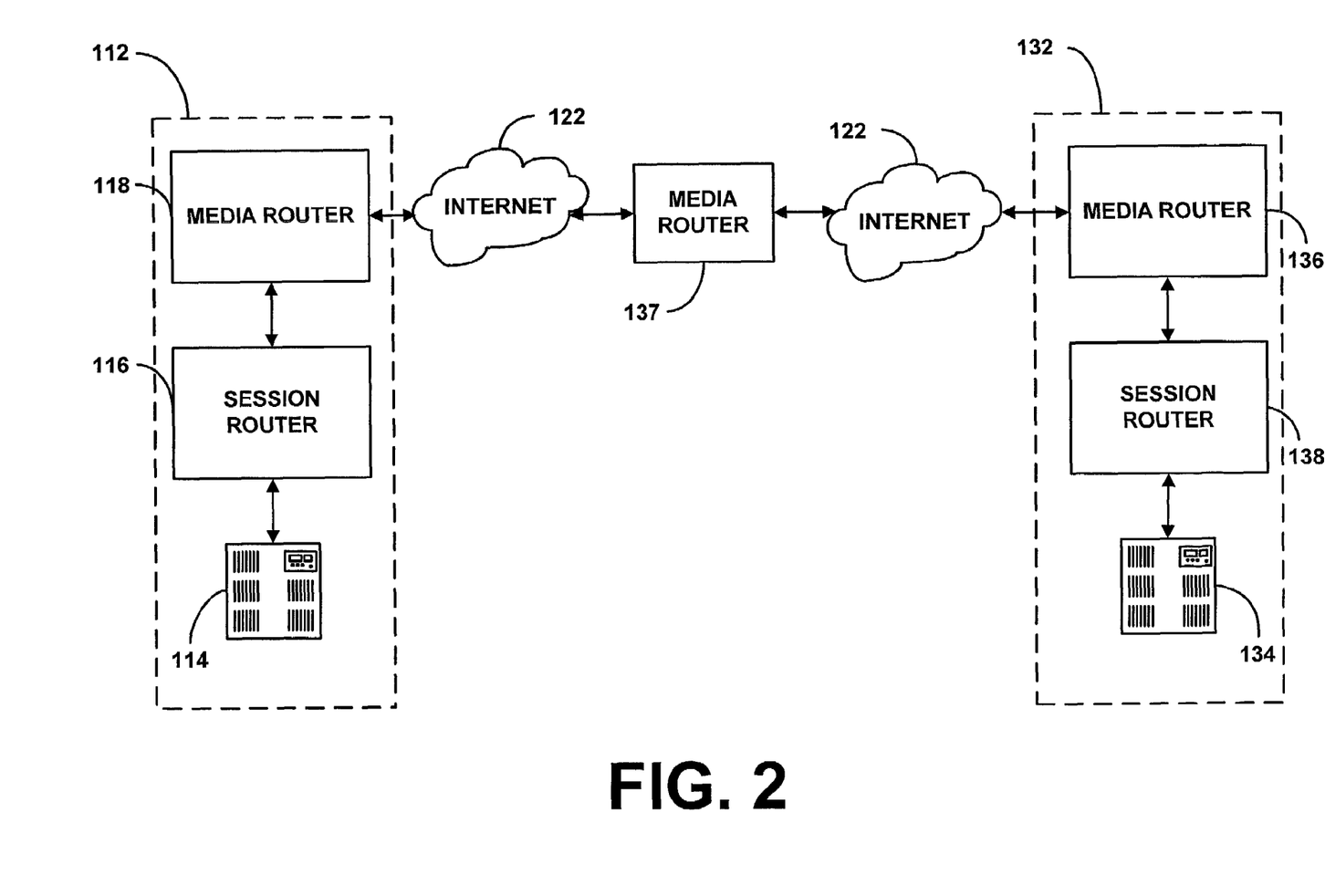
FIG. 2 is a block diagram illustrating the use of three multi-media routers instead of the two shown by FIG. 1, in accordance with an alternate embodiment of the invention.

Additional multi-media routers may be provided between the first multi-media router 118 and the second multi-media router 136. FIG. 2 is a block diagram illustrating the use of three multi-media routers instead of two, in accordance with an alternate embodiment of the invention. As such, the first multi-media router 118, located within the first carrier network 112, communicates with a third multi-media router 137, via the Internet 122. The third multi-media router 137, in turn, communicates with the second multi-media router 136, within the second carrier network 132, via the Internet 122.

Communication between two multi-media routers is herein referred to as a communication segment, wherein communication segments are defined as inter-multi-media router RTP flows. Therefore, if an RTP flow is from a source, such as the first SIP phone 114, in FIG. 1, to a first multi-media router, to a second multi-media router, and finally, to a destination, such as the second SIP phone 134, three communication segments exist. The first communication segment is from the source to the first multi-media router; the second communication segment is from the first multi-media router to the second multi-media router; and the third communication segment is from the second multi-media router to the destination. Of specific interest with reference to the present encryption system is the second communication segment, namely, from the first multi-media router to the second multi-media router. It should be noted, however, that encryption in accordance with the present invention may be provided between any two end-points.

Figure 3:
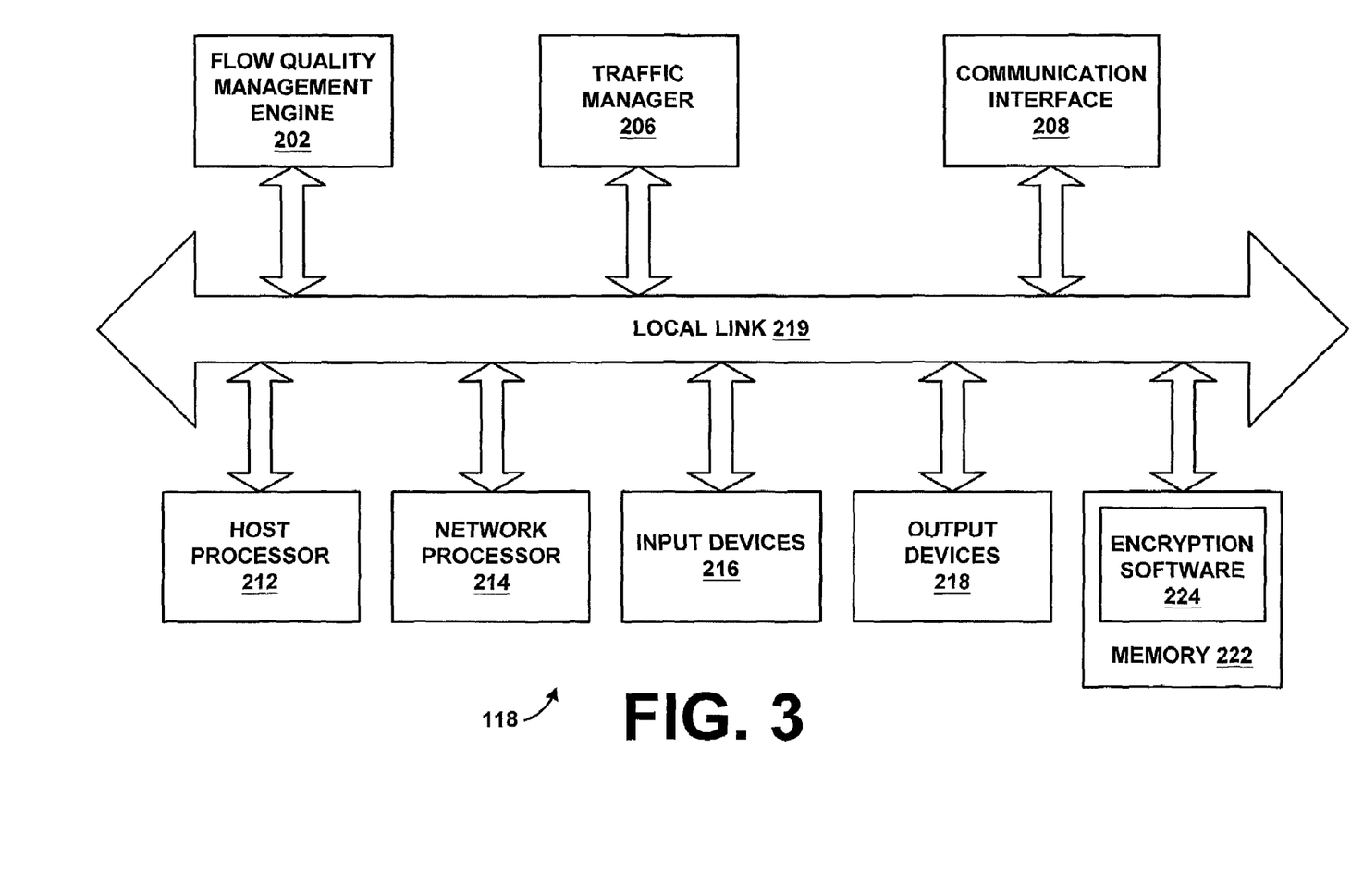
FIG. 3 is a block diagram further illustrating a multi-media router, such as the first or second multi-media router of FIG. 1, which may be used for purposes of providing encryption capabilities within the communication network of FIG. 1.

The introduction of multi-media routers into the real-time multi-media flow forces data packets through a known interface, which may act as an encryption multi-mediator. FIG. 3 is a block diagram further illustrating a multi-media router 118, such as the first or second multi-media router 118, 136, which may be used for purposes of providing encryption capabilities within the communication network 102. As shown by FIG. 3, the multi-media router 118 comprises a flow quality management engine 202, a traffic manager 206, a communication interface 208, a host processor 212, a network processor 214, input devices 216 and output devices 218, all of which communicate within the multi-media router 118 via local link 219. Each of the above-mentioned are described in detail in the presently pending patent application entitled, "System and Method for Providing Rapid Rerouting of Real Time Multi-Media Flows," filed on Jul. 23, 2001, and having Ser. No. 09/911,304.

Specifically, the traffic manager 206 is preferably used for measuring and enforcing IP session data flow rates, or traffic, for providing traffic measurement. An example of a commercially available traffic manager 206 is an NPX5700 traffic manager sold by MMC Networks located in California, USA. Essentially, the traffic manager 206 measures the number of data packets that flow through the communication interface 208. The traffic manager 206 works in concert with the network processor 214 such that once a forwarding decision is made, the traffic manager 206 queues the received packet into its respective IP flow and associated priority.

As is known in the art, the traffic manager 206 comprises a memory for temporarily storing received data packets. From an inbound perspective, the multi-media router 118 is able to monitor RTP data flows and enforce maximum data rates by either dropping packets or marking them as eligible for discarding if they are outside a bandwidth allocated for the data flow. The traffic manager 156 may also be instructed by a session router to accept a specific amount of data in accordance with an allocated bandwidth and bit rate. Therefore, if data is received at a higher bit rate than allowed by the session router, the data received at the higher bit rate is not transmitted. It should be noted that the characteristics specified by the session router may instead be programmed directly into the multi-media router 118 without using the session router.

The flow quality management engine 202 provides translation services within the multi-media router 118, quality measurement services, and detection and correction of upstream and downstream failures. The translation services performed by the flow quality management engine 202 within the multi-media router 118 comprise the capability to translate a source address, destination address, source port, destination port or any combination of these fields. The multi-media router 118 is also capable of removing and/or inserting a multi-protocol label switching (MPLS) tag in the IP header of a multi-media data flow packet. In addition, the multi-media router 118 is capable of inserting or modifying a diff-serv codepoint located within the IP header of the packet, which, as is known in the art, is used to modify priority of the data packets.

The quality measurement services provided by the flow quality management engine 202, within the multi-media router 118, are provided on a per flow basis, wherein a multi-media data flow is defined by a source IP address, a destination IP address, a source port, and a destination port. Quality measurement preferably comprises maintaining current statistics for the flow within the network processor 214, as well as aggregate and min/max statistics for the flow where applicable. Examples of statistics that may be collected include latency, jitter and packet loss for a pre-defined window of time. It should be noted that the window can be identified via the session router or the multi-media router 118. Aggregate statistics may include transmitted packets, dropped packets and duplicate packets. Minimum and maximum statistics, otherwise referred to as boundary statistics, may also be collected which may include latency, jitter and packet loss per window of time. The flow quality management engine 202, within the multi-media router 118, also provides the detection and correction of upstream and downstream failures in the transmission of RTP data packets The host processor 212, similar to the traffic manager 206, provides detection and correction of upstream and downstream failures. Methods used by the host processor 212 to detect and correct upstream and downstream failures in the transmission of RTP data packets include, but are not limited to, the use of link failures and external management events A memory unit 222 is also located within the multi-media router 118. Encryption software 224 is stored within the memory unit 222 for providing logic to be performed in accordance with the present encryption system. FIGS. 4 and 5, described hereinbelow, provide flow charts illustrating functionality performed by the present encryption system in accordance with the encryption software 224 of FIG. 3.

Figure 4:
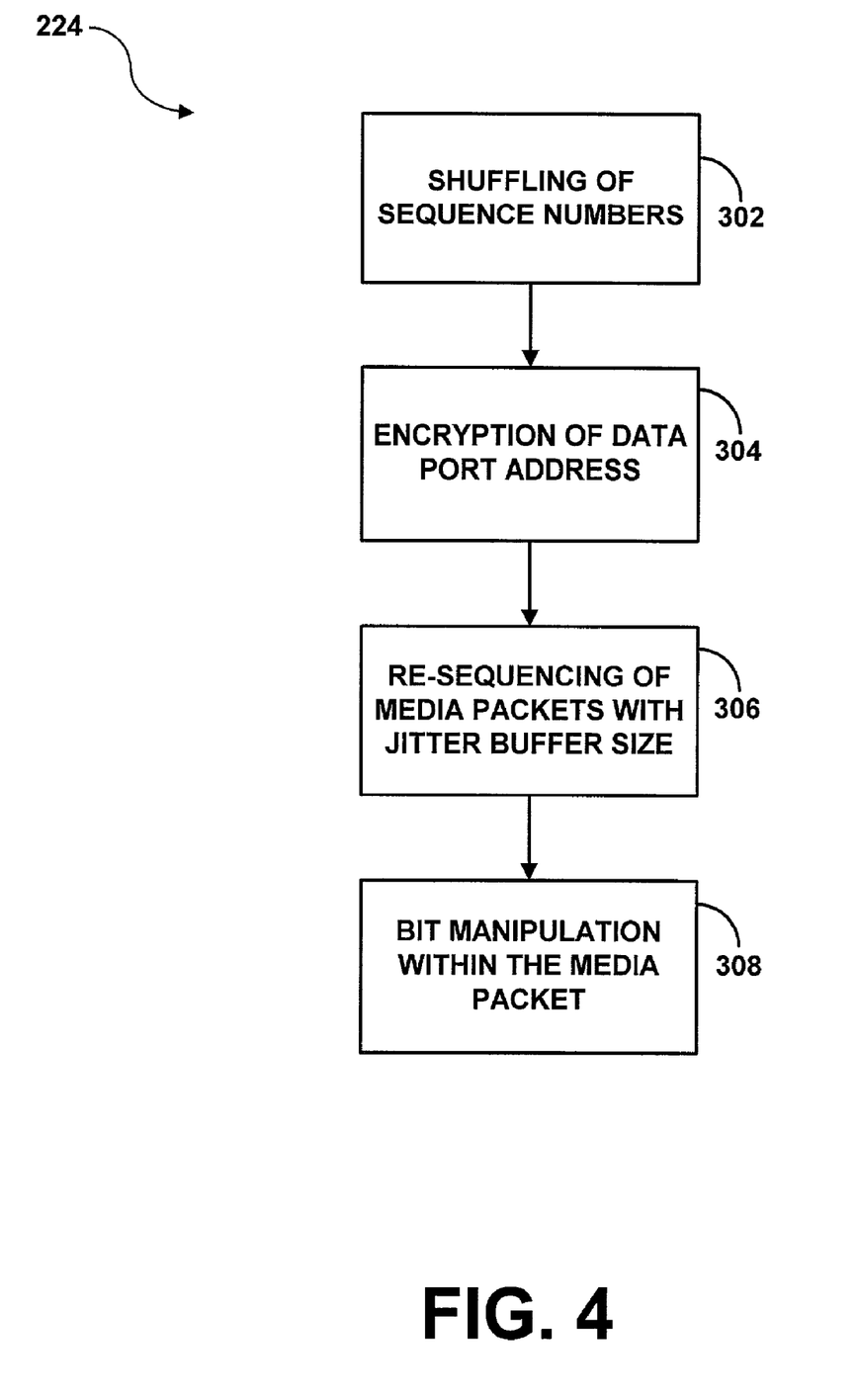
FIG. 4 is a flow chart illustrating operations performed by the present encryption system to provide encryption of multi-media data packets transmitted within RTP flows.

FIG. 4 is a flow chart illustrating operations performed by the present encryption system to provide encryption of multi-media data packets transmitted within RTP flows. With regard to FIG. 4 described hereinbelow, a block represents a module, segment, or portion of code, which comprises one or more executable instructions for implementing the specified logical function(s). It should also be noted that in some alternate implementations, the functions noted in the blocks may occur out of the order noted. For example, two blocks shown in succession may in fact be executed substantially concurrently, or the blocks may sometimes be executed in the reverse order, depending upon the functionality involved.

As shown by block 302, sequence numbers within the RTP flow are randomly shuffled. In accordance with the preferred embodiment of the invention, a sequence number is assigned to each RTP multi-media data flow packet within an RTP flow such that when an RTP multi-media data flow packet is received, the associated sequence number may be determined. Randomization code is utilized to provide random shuffling of the sequence numbers. Preferably, the random shuffling is algorithmically predictable if a key to the randomization code is known. Therefore, since the randomly shuffled sequence numbers are algorithmically predictable if the key is known, the sequence numbers really are not randomly shuffled but are instead, pseudo-randomly shuffled.

The following provides an example of code that may be utilized to provide randomization of sequence numbers that are used to provide encryption of multi-media packets. It should be noted that the following "C" code, which may be written on a Linux platform, is provided as an example of code that may be used to randomize, and therefore, is not intended to be a limitation on code that may be used for randomization purposes.

EXAMPLE

```
#include <stdlib.h>
main( )
{
    int salt = 89;
    int sequence = 1;
    srand (salt);
    for (sequence = 1; sequence <= 10; ++sequence) {
        printf("sequence %d=%d\n", sequence, rand( ));
    }
}
```

When executed, this code produces the following output:
sequence 1=1888747329
sequence 2=1601588182
sequence 3=1967410106
sequence 4=1009646503
sequence 5=230365314
sequence 6=1353059132
sequence 7=1304719048
sequence 8=497992519
sequence 9=346418450
sequence 10=17439427

Therefore, a one to one mapping of the sequence numbers in order may be made to random numbers. For instance, 1304719048 maps to 7, and 7 maps to 1304719048.

Applying this mapping to the step of randomly shuffling sequence numbers within an RTP multi-media data flow (block 302), the first RTP multi-media data flow packet has a sequence number 1888747329 (which maps to 1), the second packet has a sequence number 1601588182 (which maps to 2), and so on. Using this algorithm, the receiving side may produce a sequence of expected sequence numbers and restore them. As an example, a sender that is transmitting an original sequence number of 1 (or a salt value of 1) may replace the original sequence number with an encrypted sequence number of 1888747329. The encrypted sequence number of 1888747329 may then be transmitted to a receiving side. Upon receipt of the encrypted sequence number, the side receiving may restore to the original sequence number of 1. Therefore, if the starting value, otherwise referred to as the original value, is known, an encrypted sequence number can be produced and decoded. However, if the original sequence number is not known, the encrypted sequence can not be anticipated and later decoded.

In accordance with an alternate embodiment of the invention, a series of original sequence values may be utilized. As a result, a series of encrypted sequence numbers are utilized which makes decryption much less likely. Therefore, if there are multiple flows of multi-media data packets (RTP data packets) being transmitted from the first multi-media router to the second multi-media router, each multi-media packet may have a separate original sequence value, thereby providing excessive scrambling of the data associated with the multi-media data packet.

Returning to FIG. 4, a destination port address for the multi-media data packet may also be encrypted (block 304). Preferably, an IP address is used to enable delivery of a multi-media data packet to a multi-media router. As is known in the art, an IP address comprises an address of a destination device, as well as a destination port address within the destination device. With reference to the present encryption system, the IP address identifies a destination multi-media router and a destination port address within the same multi-media router. Since the IP address is used to deliver the multi-media data packet to the destination multi-media router, it is possible to encrypt the destination port address to provide further difficulty in decrypting transmitted multi-media data packets.

In accordance with the preferred embodiment of the invention, the port address number is encrypted so that it may be restored in the future, as is described in detail hereinbelow. Following the above provided example, a salt value, or original sequence number, of eighty-nine (89) has been assigned as an identifier of the group of ten sequence numbers that may be used for encryption purposes. A first method of providing encryption of the port address number is by having a repeating sequence of numbers for the destination port address number. In accordance with the present example, the sequence of numbers starts at 1888747329 and progresses through the tenth number 17439427. It should be noted that the length of the sequence number may be variable.

In accordance with the first method, the port address number may be based on either the salt value, which in the present example is 89, or it may be determined from the sequence numbers. An example of utilizing the salt value follows. If the salt value is 89, the sequence numbers are determined to be 1 through 10, and the sequence numbers are repeated, the port number is 89 (the salt value) multiplied by 10 (the length of the sequence), or 890. In addition, if there is more than one multi-media data flow, the random port address numbers are very difficult to detect without knowledge of the salt value.

As shown by block 306, re-sequencing of the multi-media data packets is then performed within an appropriate jitter buffer size. A jitter buffer is typically implemented in voice gateways to compensate for fluctuating network conditions. The jitter buffer is a packet buffer that holds incoming multi-media data packets for a specified time before forwarding them for decompression. This process has the effect of smoothing the multi-media data packet flow, thereby increasing the resiliency of a compressor/decompressor (CODEC) to packet loss, delaying packets, and producing other transmission effects. However, the downside of the jitter buffer is that it can add significant delay. The jitter buffer size is configurable, and can be optimized for given network conditions. The jitter buffer size is usually set to be an integral multiple of the expected packet inter-arrival time in order to buffer an integral number of multi-media data packets.

Re-sequencing of multi-media data packets allows multi-media data packets to be transmitted from a first multi-media router to a second multi-media router in a random manner within a small repeating window. In accordance with the abovementioned example, multi-media data packets may be transmitted, and arrive, in a normal order such as 1, 2, 3, 4, 5, etc. However, in accordance with the re-sequencing of multi-media data packets, the multi-media data packets may be transmitted in any order desired, including, but not limited to, 2, 5, 4, 1, 3, etc. This re-sequencing prevents anyone from assembling the multi-media data packets in the order sent, disregarding the sequence number, and being able to decipher the communication.

As shown by block 308, bit manipulation within the multi-media data packet is performed to provide further encryption of the multi-media data packets. An example of bit manipulation may be performed using bitsize operations that are restorable, such as, but not limited to, the ~operator (newbits=~oldbits). As is known in the art, the ~operator is a negation operator. Therefore, every "1" bit becomes a "0" bit, and every "0" bit becomes a "1" bit. As an example, the binary number 10011100 becomes 01100011.

Other bitsize operations may include shifting bits to the left, as is illustrated in the examples hereinbelow.

EXAMPLE

Newbits=(oldbits & 0x0f)<<4||(oldbits & 0xf0>>4)

This example essentially swaps bits 0-3 with bits 4-7.

In addition, bytes may be swapped in an algorithmic fashion based on a mapping sequence rendered from a random number. As an example, assuming that there are 256 bytes in a multi-media packet, the bytes may be swapped or mixed based on a sequence rendered from 1 to 256 where duplicates are skipped. Therefore, any salt value may be used, and when the random number is generated it is modulo divided by 256. The sequence is then run until there are 256 unique numbers. If a duplicate is encountered during running of the sequence, it is skipped.

Thus a pattern emerges such as the pattern shown hereinbelow.

1=23
2=220
3=19
4=113
5=78
.....
256=21

This sequence can be created very efficiently. As mentioned hereinabove, if a duplicate is encountered, the duplicate is skipped. Thus, if a second 19 is generated when sequence 15 is being computed, the 19 is skipped, and a new call to a random number generator generating the sequence is called so that the sequence will be complete.

The following provides a detailed example of sequencing random numbers. Assuming use of the sequence numbers provided in the example illustrated hereinbelow, if a sequence of numbers from 0 to 4 is desired to swap bytes, the following steps are performed. The random number is taken and divided by the number of sequence numbers desired (in this example 5) (1888747329/5=377749465, remainder=4). The remainder is then recorded after division. The process is then repeated for the entire sequence resulting in the following.

sequence 1=4
sequence 2=2
sequence 3=1
sequence 4=3
sequence 5=4
sequence 6=2
sequence 7=3
sequence 8=4
sequence 9=0
sequence 10=2

A list is assembled in order having no duplicates and using the sequence of numbers shown above (4, 2, 1, 3, 0). It should be noted that sequences 5, 6, 7 and 8 were dropped since they were duplicates until five unique integers from 0-4 were obtained.

To swap the bytes in this order, the new sequence is used as index positions in a "byte swapping" scheme.

newarray[4]=oldarray[0]
newarray[2]=oldarray[1]
newarray[1]=oldarray[2]
newarray[3]=oldarray[3]
newarray[0]=oldarray[4]

To restore the data to its original form, the following "reverse" translations are performed.

oldarray[0]=newarray[4]
    oldarray[1]=newarray[2]
    oldarray[2]=newarray[1]
    oldarray[3]=newarray[3]
    oldarray[4]=newarray[0]

An example of how the generator may be algorithmically coded follows.

EXAMPLE

```
#include <stdlib.h>
main( )
{
    int salt = 89;
    int sequence = 0;
    int results[256];
    srand(salt);
    for (sequence=0; sequence < 256; ++sequence) {
        results[sequence] = rand( ); /* Get the next random number */
        for (i=0; i < 256 &&I < sequence; ++i) {/* See if the sequence is in the list */
            if (results[sequence] == results[i]) {
                --sequence; /* Already in the list, skip this one */
                break;
            }
        }
    }
    for (sequence=0; sequence <256; ++sequence) { /* Display the list */
        printf("Sequence = %d, New sequence number=%d\n",
                sequence, results[sequence]);
    }
}
```

With this coded logic, all 256 bytes of the multi-media data packet may be encrypted before leaving the first multi-media router, and be restored upon arrival at the second multi-media router.

As mentioned hereinabove, any single encryption step described by FIG. 4 may be used to provide encryption of multi-media data packets. In addition, any combination of the above-mentioned encryption steps may be used to provide encryption of multi-media data packets. Further, the above-mentioned operations described by the flowchart of FIG. 4 may be performed by a programmed controller, or any other hardware for that matter, instead of, or in addition to being performed in accordance with software.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The following is claimed:

1. A method for encrypting muli-media data flow packets, comprising the steps of:
    receiving a series of multi-media data flow packets;
    storing the series of multi-media data flow packets in a jitter buffer;
    pseudo-randomly shuffling a destination address of each of the multi-media data flow packets;
    re-sequencing the series of multi-media data flow packets into a pseudo-random order; and
    transmitting each multi-media data flow packet in the re-sequenced series in the re-sequenced order.

2. The method of claim 1, wherein said re-sequencing uses a randomization code that is algorithmically predictable if a key to said randomization code is known.

3. The method of claim 1, further comprising the step of performing bit manipulation within said first multi-media data flow packet.

4. The method of claim 3, wherein said step of performing bit manipulation is performed by using a bit-size operation that is restorable.

5. The method of claim 4, wherein said bit-size operation comprises negation.

6. The method of claim 1, wherein said destination address is a destination port address.

7. A computer readable storage medium having a program for encrypting multi-media data flow packets, the program performing the steps of:
    receiving a series of multi-media data flow packets;
    storing the series of multi-media data flow packets in a jitter buffer;
    pseudo-randomly shuffling a destination address of each of the multi-media data flow packets;
    re-sequencing the series of multi-media data flow packets into a pseudo-random order; and
    transmitting each multi-media data flow packet in the re-sequenced series in the re-sequenced order.

8. The computer readable medium of claim 7, wherein said re-sequencing uses a randomization code that is algorithmically predictable if a key to said randomization code is known.

9. The computer readable medium of claim 7, the program further comprising logic for performing the step of performing bit manipulation within said first multi-media data flow packet.

10. The computer readable medium of claim 9, wherein said step of performing bit manipulation is performed by using a bit-size operation that is restorable.

11. The computer readable medium of claim 10, wherein said bit-size operation comprises negation.

12. The computer readable storage medium of claim 7, wherein said destination address is a destination port address.

13. A system for encrypting muli-media data flow packets, comprising:
- a transceiver;
- software defining functions to be performed by the system; and
- a processor configured by said software to perform the steps of:
- receiving a series of multi-media data flow packets;
- storing the series of multi-media data flow packets in a jitter buffer;
- pseudo-randomly shuffling a destination address of each of the multi-media data flow packets;
- re-sequencing the series of multi-media data flow packets into a pseudo-random order; and
- transmitting each multi-media data flow packet in the re-sequenced series in the re-sequenced order.

14. The system of claim 13, wherein said re-sequencing uses a randomization code that is algorithmically predictable if a key to said randomization code is known.

15. The system of claim 13, wherein said destination address is a destination port address.

16. A method of encrypting a series of multi-media data flow packets, comprising the steps of:
- receiving a series of multi-media data flow packets belonging to a first flow, each packet in the series having a port address that is the same as the port address of the other packets in the series;
- generating a pseudo-random sequence of numbers, the sequence of numbers associated with the port address;
- replacing the port address in each packet with the product of a corresponding number in the sequence of numbers and the size of the sequence; and
- transmitting each packet to a receiver.

17. The method of claim 16, wherein the generating step uses a randomization code that is predictable if a key to the randomization code is known.

18. The method of claim 17, wherein the key is known to the receiver.

19. The method of claim 16, wherein the size of the sequence is known to the receiver.

20. The method of claim 16, wherein the port address comprises a destination port address.

* * * * *